United States Patent Office 3,382,194
Patented May 7, 1968

3,382,194
EXPANDED PLASTIC MATERIALS
Gordon Birkett, Costock, England, assignor to Whiffen
& Sons Limited, Loughborough, Leicestershire, England
No Drawing. Filed Nov. 9, 1965, Ser. No. 507,065
Claims priority, application Great Britain, Nov. 21, 1964,
47,485/64
9 Claims. (Cl. 260—2.5)

ABSTRACT OF THE DISCLOSURE

Embossed patterns on gas-expandable organic polymeric materials are formed by contacting the polymeric material which includes azodicarbonamide as a blowing agent and sufficient heavy metal compound to lower the decomposition temperature of azodicarbonamide, in selected areas, with a hydrazide of an organic dicarboxylic acid.

---

The present invention relates to improved processes for the manufacture of expanded plastic materials.

It is well known that azodicarbonamide is a blowing agent for plastics, by which term is meant both rubber and synthetic resinous materials, such as polyvinyl chloride, polyvinyl acetate, polyethylene and the like; azodicarbonamide is widely used as a blowing agent for polyvinyl chloride.

Azodicarbonamide, when pure, has a decomposition point of about 225° C. It is known this decomposition point can be lowered by admixture with various compounds, usually referred to as "kickers." Thus for example basic compounds of heavy metals, such as basic lead carbonate and zinc octoate, reduce the decomposition temperature down to about 155° C., and bases, such as hydrazine, reduce the decomposition temperature down to room temperature. It will thus be seen that the blowing temperature of azodicarbonamide in a mix is conditioned by the components present in that mix.

Heavy metal salts are normally used as stabilizers in plastic mixes, and their use when azodicarbonamide is used as the blowing agent can lead to premature expansion of the product.

It has now been found that the activation effect of these heavy metal salts is inhibited by hydrazides of dicarboxylic acids. By the use of a hydrazide of a dicarboxylic acid in this way, the decomposition temperature of the azodicarbonamide is raised towards its normal decomposition temperature, thus permitting a number of objectives being obtained, as are described in detail below.

Accordingly the present invention is for the processing of plastic materials containing azodicarbonamide characterised in that the plastic materials are contacted with the hydrazide of a dicarboxylic acid.

The invention is particularly concerned with plastic mixes which contain a salt or compound of a heavy metal such as lead, zinc or cadmium. The invention is also particularly concerned with, although not limited to, plastic mixes based on polyvinyl chloride. Other plastic materials which may be used include rubber, polyvinylacetate, polyethylene, polypropylene, acrylonitrile-butadiene rubbers and acrylonitrile-butadiene rubber-polyvinyl chloride blends, styrene resins, for example acrylonitrile-butadiene-styrene resins, polyvinylidiene chloride resins such as Saran, and the like.

The hydrazide of a dicarboxylic acid may comprise for example oxalic dihydrazide, cyclic phthalic hydrazide, cyclic maleic hydrazide, succinic dihydrazide, malic hydrazide, tartaric hydrazide, adipic dihydrazide, sebacic dihydrazide, malonic hydrazide or fumaric hydrazide.

The amount of the hydrazide used may vary over a wide range; obviously the minimum amount to produce the desired effect will normally be used, for reasons of economy. The hydrazide may be used in amount comprising for example 0.1 to 5% by weight of the plastic mix. It is generally preferred to use the hydrazide in amount comprising about 0.25% by weight of the plastic mix.

According to one embodiment of the invention, the hydrazide is incorporated in the plastic mix together with other components to obtain a uniform expanded product, the hydrazide controlling the blowing temperature of the azodicarbonamide, thus overcoming the risk of premature blowing, and permitting a wider choice of components.

According to another, and preferred embodiment, the present invention is used to obtain selective inhibition of expansion so as to obtain an expanded sheet with relief effect. In accordance with this embodiment of the invention, a pattern of the hydrazide is applied to the surface of the plastic mix containing azodicarbonamide, before the final heat expansion stage. The hydrazide has the effect of greatly reducing the expansion of the gelled film in contact with it, with the result that non-uniform expansion is obtained. In this way relief effects may be produced without recourse to embossing rolls. The amount of hydrazide may be as indicated above.

This embodiment of the invention is of special application in the manufacture of flooring, wall and ceiling covering materials. For flooring materials, heavy grade materials are obviously required, and the flooring material is usually made of a textile base laminated to the main supporting plastic sheet which may be expanded or non-expanded, and to which is laminated the decorative surface sheet, which can be differentially expanded in accordance with the invention to produce the decorative wear surface. For wall and ceiling covering materials, which may be considered as wall papers, these may comprise a paper or fabric base to which is laminated the surface sheet, which is differentially expanded in accordance with the invention to produce the desired decorative surface. Obviously, the differential expansion technique may be used to prepare a variety of different products, such for example as simulated leather etc.

The decorative film produced according to the invention may be laminated to supporting sheets or structures before or after expansion, as is desired. In order to prepare the decorative film, the base film is formulated from the plastic material, usual1 polyvinyl chloride, together with conventional components such as plasticizers, stabilizers and fillers together with heavy metal salts, and is partially gelled. The inhibitor hydrazides are dispersed or dissolved in conventional printing ink or coating compositions of either a pigmented or clear nature; such compositions should normally be of the organic solvent type. The inhibitor composition is applied to the surface of the partially gelled base film, and the sheet is ready for expansion. If desired the film may then be coated with a transparent plastisol, which will provide a wearing surface. When the film is heated to decomposition temperature of the blowing agent in the composition, only that part of the sheet not coated with the inhibitor composition will expand normally; the portions coated with the inhibitor composition will expand less than normally, if at all, giving a relief pattern. Obviously the pigments incorporated in the inhibitor composition can be chosen to enhance this effect.

The degree of gelation of the base film at the time of application of the inhibitor composition is important if the desired effect is to be obtained. In order to print the surface of the base film by conventional means, the physical condition of the base film must be such that adhesion to the printing rollers does not occur. It is, therefore, necessary for the base film to be partially gelled before the application of the inhibitor composition. However if the base film is gelled to too great an extent, the desired effect is not obtained, due to lack of penetration of the inhibitor. For optimum results the base film should be gelled to the minimum extent so as to permit printing. It has been found, for example, that heating for 25–60 seconds at 100° C. is appropriate with polyvinyl chloride mixes.

The inhibitor composition may comprise a film forming resin, such as polyvinyl chloride or a co-polymer of vinyl chloride and vinyl acetate, an organic solvent or dispersant such as a ketone (for example methyl ethyl ketone, methylisobutyl ketone or cyclohexanone), ester (for example ethylacetate), hydrocarbon (for example toluene or xylene), tetrahydrofuran and the like and the hydrazide of a dicarboxylic acid, with or without pigments or dyes. The inhibitor composition suitably contains 10–15% solids, and has a viscosity of the order of 1600 centipoises. The amount of hydrazide in the inhibitor composition may vary over a wide range, and may comprise for example 0.1–5% of the composition.

In operation the base film containing azodicarbonamide and a heavy metal salt is cast onto release paper or other substrate, and is partially gelled. The partially gelled surface is printed with the inhibitor composition, and if desired the surface covered with a transparent wear surface. The sheet is then heated to decompose the blowing agent, producing a partially expanded sheet with a relief pattern corresponding to the design of the applied inhibitor. Where the base film is prepared on release paper, this can be separately laminated to any suitable substrate.

The degree of expansion overall will obviously depend on the amount of blowing agent used and the blowing temperature; similarly the differential in expansion will be related to the amount of the hydrazide used. Thus, one can prepare slightly expanded sheets with very shallow relief patterns or at the other extreme highly expanded sheets with very deep relief patterns, or other desired combinations.

A further embodiment of the invention is concerned with the reprocessing of scrap.

Manufacturers of expanded vinyl plastic materials produce significant quantities of scrap paste, and where the plastic material contains blowing agents, e.g. azodicarbonamide, this is not suitable for reuse either in non-expanded products as the blowing agent causes bubbling or pitting of the re-used material, or in expanded products as uncontrolled expansion occurs. It has now been found that by admixing the scrap material with a hydrazide of a dicarboxylic acid, the action of blowing agent is inhibited, and the scrap material can be usefully reprocessed.

Accordingly, this embodiment of the invention is for the re-processing of plastic materials containing blowing agents, especially azodicarbonamide, characterized in that a hydrazide of a dicarboxylic acid is admixed with the plastic material before fusion. The amount of hydrazide suitably comprises 0.1 to 5% of the plastic mix.

The following examples are given to illustrate the present invention. Parts and percentages are by weight unless otherwise indicated.

EXAMPLE 1

A polyvinyl chloride composition was made up from the following components:

| | Parts |
|---|---|
| Polyvinyl chloride (Breon 121) | 100 |
| Dioctyl phthalate | 80 |
| Azodicarbonamide | 4 |
| Whiting | 5 |
| Basic lead carbonate | 6 | together with the hydrazide indicated in the table below.

The composition was spread on release paper to produce a film 0.017 inch thick. This was heated at 195° C. for 90 seconds. The expansion of the film was then measured.

| Organic hydrazide | Amount, parts | Expansion, percent |
|---|---|---|
| Oxalic dihydrazide | 3 | 70 |
| Do | 0.5 | 200 |
| Phthalic hydrazide | 3 | 70 |
| Do | 0.5 | 300 |
| Cyclic maleic hydrazide | 3 | 70 |
| Succinic dihydrazide | 3 | 250 |
| Adipic hydrazide | 3 | 250 |
| Sebacic dihydrazide | 3 | 250 |
| Control | | 450 |

EXAMPLE 2

A film was prepared from 100 parts of polyvinyl chloride, 80 parts of dioctyl phthalate, 4 parts of azodicarbonamide, 5 parts of whiting and 3 parts of zinc octoate, spread to 0.017 inch thickness on release paper. To the surface of this film were applied stripes of a printing ink made of 0.6 part of oxalic dihydrazide, 0.6 part dioctyl phthalate and 100 parts of a normal 20% solids vinyl lacquer. The film was then heated at 90 seconds at 195° C. The resulting product had pale yellow stripes on a cream background, the coloured stripes being of a smaller thickness than the remainder, similar to an embossed effect.

I claim:
1. A method for producing an embossed pattern on a film of a gas-expandable organic polymeric material containing a blowing amount of azodicarbonamide and a small amount of a heavy metal compound sufficient to lower the decomposition temperature of the azodicarbonamide which method comprises contacting the polymeric material in selected areas with from about 0.5 to 5.0% by weight with a hydrazide of an organic dicarboxylic acid.

2. The method of claim 1 wherein the polymeric material is selected from the group consisting of vinyl chloride resins, vinylidene chloride resins, acrylonitrile-butadiene-styrene resins, acrylonitrile-butadiene elastomers, polyethylene, polypropylene, and blends thereof.

3. The method of claim 1 wherein the heavy metal compound contains a metal selected from the group consisting of zinc, lead and cadmium and combinations thereof.

4. The method of claim 1 wherein the hydrazide is the hydrazide of a dicarboxylic acid selected from the group consisting of oxalic dihydrazide, maleic hydrazide, phthalic hydrazide, succinic dihydrazide, malic hydrazide, tartaric hydrazide, adipic dihydrazide, fumaric hydrazide, malonic hydrazide, sebacic hydrazide, and blends thereof.

5. The method of claim 1 for chemically embossing a relief pattern in an expanded plastic sheet material wherein a mix containing the plastic material is formed into a sheet and partially gelled, a pattern of the hydrazide is applied to the surface of the sheet and the sheet is heated and expanded producing a relief effect on the surface thereof.

6. The method of claim 5 wherein the hydrazide is applied to the surface of the sheet material and the sheet material before application of the pattern is partially gelled to the minimum extent to permit printing.

7. The method of claim 5 wherein the hydrazide is applied in a solvent to the upper gelled surface of the sheet material prior to expansion.

8. The method of claim 5 wherein a transparent wear-resistant surface-layer is applied to the sheet before expansion thereof.

9. A cellular sheet product produced by the process of claim 1.

References Cited

UNITED STATES PATENTS

| | | | |
|---|---|---|---|
| 3,197,423 | 7/1965 | Ackerman | 260—2.5 |
| 3,278,466 | 10/1966 | Cram et al. | 260—2.5 |
| 3,293,094 | 12/1966 | Nairn et al. | 264—52 |
| 3,293,108 | 12/1966 | Nairn et al. | 264—52 |
| 3,305,496 | 2/1967 | Riley et al. | 260—2.5 |
| 3,321,413 | 5/1967 | Riley et al. | 260—2.5 |

MURRAY TILLMAN, *Primary Examiner.*

M. FOELAK, *Assistant Examiner.*